United States Patent Office 2,900,328
Patented Aug. 18, 1959

2,900,328

HYDROFORMING PROCESS USING ALUMINA SUPPORTED SHOCK-COOLED CATALYST

Charles H. Worsham, Fanwood, and Charles W. Skarstrom, Montvale, N.J., assignors to Esso Research and Engineering Company, a corporation of Delaware No Drawing. Application August 10, 1954
Serial No. 449,023

5 Claims. (Cl. 208—136)

The present invention relates to the manufacture of catalyst useful in accelerating the hydroforming of naphthas.

In a more specific sense, the present invention relates to the production of a hydroforming catalyst which has improved properties with respect to its activity in accelerating hydroforming reactions, its heat stability in onstream operation, and during regeneration, and its otherwise improved properties.

Hydroforming is an operation in which naphthas of low and, therefore, unsatisfactory octane number are processed at elevated temperatures and pressures in the presence of hydrogen and a solid catalytic material. The principal chemical reaction is one in which naphthenes in the naphtha are dehydrogenated to form the corresponding aromatic. Therefore, naphthas which have a high content of naphthenes boiling in the gasoline boiling range give best results. In addition to the dehydrogenation reaction referred to above, there is also some isomerization of normal paraffins to give iso-paraffins and some isomerization of five-carbon rings to yield six-carbon rings as where, for example, ethyl cyclo-pentane is isomerized to methyl cyclo-hexane, which latter compound is then converted to toluene. There is also some hydrocracking of the higher boiling constituents of the feed to form lower boiling constituents and thus improve the volatility characteristics of the hydroformate product.

The catalysts commonly used for hydroforming are platinum or molybdenum oxide carried on an active form of alumina. However, the literature contains proposals representing that noble metals generally may be employed as the hydrogenation-dehydrogenation component of a hydroforming catalyst, and with respect to the base metals, it is represented that the oxides and sulfides of the V, VI and VIII group of the periodic system may be employed.

The present invention contemplates the hydroforming of naphthas which may be virgin naphthas, cracked naphthas or naphthas obtained in the hydrocarbon synthesis operation, utilizing a hydroforming catalyst which is in the more active state in which it exists at high temperatures. In other words, tests have indicated that a hydroforming catalyst which is at calcining temperatures possesses higher activity than the same catalyst which has been permitted to cool slowly to room temperatures. Hence, the present invention is directed toward shock chilling the calcined catalyst to preserve its more active state.

The conventional method of preparing, say, a catalyst containing 10 wt. percent molybdena on 90 wt. percent alumina is, first, to provide a suitable base of carrier, such as an active form of alumina. An excellent carrier for the dehydrogenation component of a hydroforming catalyst is the eta form of alumina. This form of alumina is prepared by reacting metallic aluminum with an alcohol, such as amyl alcohol, in the presence of a small amount of mercury chloride or oxide. The alcohol reacts with the aluminum under gentle heating, say, heating to a temperature of about 100°–125° F. to start the reaction. Thereafter it proceeds smoothly without further heating. The alcoholate produced is then hydrolyzed by adding water containing 10% by volume of concentrated ammonium hydroxide. This hydrolyzing water containing ammonium hydroxide is slowly added to the aluminum alcoholate while stirring. Best results are achieved by carrying out this hydrolysis at a temperature of from about 80°–100° F. The slurry which is formed during the hydrolysis is permitted to stand at about room temperature for 4–20 hours, whereupon the beta trihydrate of alumina is formed. After aging, the supernatant liquid is separated from the precipitated trihydrate, and the latter is dried for several hours at a temperature of 200°–400° F. During this drying treatment, the water and ammonia associated with the alumina is substantially removed. The alumina, which is substantially 100% in the beta trihydrate form, is then calcined at elevated temperatures, say, temperatures of from about 1100° to 1500° F. The calcined alumina is cooled and impregnated with an aqueous solution of a salt or other compound of the hydrogenation-dehydrogenation component of the catalyst. In the case of the preparation of a molybdenum oxide on alumina catalyst, the impregnating solution may be ammonium molybdate, whereas, in the case where the platinum-containing catalyst is to be prepared, usually a solution of chloroplatinic acid in water is used to impregnate the alumina. In the case of the molybdenum oxide containing catalyst preparation, the impregnated base is subjected to heating whereby the molybdate salt is converted to the oxide. In the case of the preparation of a platinum-containing catalyst, the impregnated base is heated at about 250° F. for, say, 16 hours, and then treated with hydrogen to form platinum in situ. The foregoing represents conventional methods of preparing either a molybdena-containing hydroforming catalyst or a platinum-containing catalyst.

It has been found that a catalyst of improved properties may be prepared by modifying the foregoing methods with respect to the procedure following the calcination. Thus, the present invention, as previously indicated, provides for shock chilling the catalyst composition following calcination. In other words, after calcination at a temperature of 1100°–1500° F., for several hours, say, 2–16, preferably, in an atmosphere of $N_2$, the catalyst is immediately chilled by charging it into an environment of sufficient heat-removing capacity to effect the desired result of rapid cooling. One method of accomplishing this result is to mix the hot calcined catalyst with a batch of chilled solids, which solids may be at a temperature corresponding to that of melting ice or solid carbon dioxide, and the hot calcined catalyst is cooled to at least room temperature in a matter of a few seconds by utilizing a sufficient amount of chilled solids. These solids may be composed of hydroforming catalyst, metallic "shot," such as stainless steel particles having a diameter of 300–400 microns, mullite powder or any such suitable solid material in the form of small spheres, pills, pellets, or a powder. Another good way to chill the hot calcined catalyst is to place it on a cold surface, preferably metallic; or it may be quenched in a liquid such as cold water. Any conventional method generally employed for quenching hot bodies may be employed to effect the rapid cooling of the hot calcined catalyst, which method, of course, does not effect the catalyst composition chemically or otherwise.

Without wishing to be bound by any theory, it is believed that the result of the foregoing quenching or cooling of the calcined catalyst is to control and preserve the surface energy of the catalyst occasioned by lattice defects developed during the calcination. These lattice defects, or acceptors deficient in electrons, are important in the interaction between the electrons in the hydroforming process. These defects can be measured by known conductivity or resistivity technique used by physicists in the study of semi-conductors.

In these measurements, the conductivity or the reciprocal of the resistivity is equal to the product of "$(n)(e)(u)$," where "$n$" is the number of lattice defects or acceptors, "$e$" the electronic charge and "$u$" is mobility. It has been found by measurements of the resistivity of molybdena-alumina catalyst, obtained from large pilot unit hydroforming operations, that the said measurements correlate with catalyst activity.

*Example*

In order to show the improved results obtainable by practice of the present invention, two side by side hydroforming tests were made as set forth below.

In these tests a catalyst comprising molybdenum oxide (10% by weight) on alumina (90% by weight) was prepared in a conventional manner and then calcined at 1325° F. in nitrogen for six hours. A portion of the calcined catalyst was then dropped from the calcining furnace onto Dry Ice (solid $CO_2$). Another portion of the calcined catalyst was permitted to cool in the furnace. An analysis of the feed employed in these tests with respect to the aromatic content is set forth below:

| Mass Spectrometer Analysis, Vol. Percent | Feed | Test No. 1 | | Test No. 2 | |
|---|---|---|---|---|---|
| | | Cooled in Furnace | Cooled on Dry Ice | Cooled in Furnace | Cooled on Dry Ice |
| Benzene | 0.4 | 1.2 | 1.1 | 1.0 | 1.0 |
| Toluene | 4.7 | 8.8 | 9.6 | 8.6 | 9.4 |
| $C_8$ Aromatics | 7.3 | 12.8 | 13.7 | 12.7 | 13.9 |
| $C_9$ Aromatics | 2.6 | 5.5 | 5.8 | 5.5 | 6.4 |
| $C_{10}$ Aromatics | 0.1 | 0.8 | 0.8 | 0.8 | 1.0 |
| Naphthalenes | 0.3 | 0.1 | 0.1 | 0.1 | 0.2 |
| Indan | 0.0 | 0.2 | 0.3 | 0.2 | 0.3 |
| Total Aromatics | 15.4 | 29.4 | 31.4 | 28.9 | 32.2 |

These data show an increase in aromatic content of the hydroformed product when using the shock chilled catalyst, the increase being mainly in the toluene and xylenes, which aromatics possess good octane number blending values.

The catalyst was also tested to determine whether or not it would resist activity loss during regeneration. The catalyst was, therefore, subjected to 10 cycles of $H_2$ treatment at 900° F., followed by air at 1000° F. (under atmospheric pressure during the cycles), and it was found that the catalyst maintained its activity. This is evidenced by the below data:

Refractive index of hydroformed product

Fresh calcined catalyst chilled with Dry Ice _____ 1.4303
Same catalyst as above after 10 cycles of $H_2$ and air treatment _____ 1.4319

It will be observed that the product formed after the $H_2$ and air treatment of the catalyst was substantially the same as that obtained using fresh catalyst.

It is pointed out that the foregoing improvements are applicable not only to molybdena-containing catalyst, but also to platinum group metal catalysts.

To recapitulate briefly, the present improvements relate to methods of quenching a hydroforming catalyst following the activating calcination of the catalyst. The catalyst following calcination should be cooled rapidly to a temperature of about room temperature during a period of 15 to 50 seconds, or as rapidly as possible. It will be understood that while the use of a carrier or spacing agent made by the so-called alcoholate method has been described in detail above, that other forms of alumina may be used as a carrier for the hydrogenation-dehydrogenation component of the hydroforming catalyst. Thus, good alumina bases may be non-crystalline in form, in other words, possess a gel structure. Various commercial aluminas are available, including alumina sol by the Aluminum Company of America, designated as F–10, H–41 and others. In the interest of heat stability, the alumina base should contain a minor percent of silica, say, from 1–6 wt. percent based on the total weight of catalyst.

It will be understood that the molybdena or the platinum or the other active component of the catalyst, namely, the hydrogenation-dehydrogenation component, may be impregnated into the base before or after the calcining step. Another good way to form the catalyst is the dry mix method wherein molybdena is mechanically mixed with the alumina. In the case of platinum-alumina containing 90% alumina, 10% platinum may be mixed with alumina in such proportions as to give a mixture containing from 0.5–1.5 wt. percent catalyst based on the total weight of the catalyst.

Numerous modifications of the present invention may be made by those who are familiar with the present art without departing from the spirit thereof.

What is claimed is:

1. In the method of preparing an improved hydroforming catalyst, the steps of treating a catalyst comprising an adsorptive form of alumina containing platinum by heating said catalyst to a temperature between about 1100° F. and 1500° F. for a period of time between about 2 and 16 hours and thereafter shock chilling said heated catalyst by abruptly reducing the temperature of said catalyst to about room temperature in about 15 to 50 seconds.

2. In the method of preparing an improved hydroforming catalyst, the steps of treating a catalyst comprising an adsorptive form of alumina impregnated with molybdenum oxide by heating said catalyst to a temperature between about 1100° F. and 1500° F. for a period of time between about 2 and 16 hours and thereafter shock chilling said heated catalyst by abruptly reducing the temperature of said catalyst to about room temperature in about 15 to 50 seconds.

3. A method of preparing a hydrocarbon conversion catalyst containing alumina and molybdenum oxide which comprises heating said catalyst to a temperature between about 1100° F. and 1500° F. for a period between about 2 and 16 hours and then shock chilling said heated catalyst to about room temperature in less than about 50 seconds by contacting said heated catalyst with solid carbon dioxide.

4. A method of hydroforming a naphtha which comprises contacting naphtha at hydroforming conditions of temperature and pressure in the presence of hydrogen with a catalyst comprising an adsorptive form of alumina containing molybdenum oxide and made by heating said catalyst to a calcining temperature above about 1100° F. for at least 2 hours, rapidly cooling said catalyst in no more than about 50 seconds to a temperature at least as low as room temperature, permitting the naphtha to remain in contact with said catalyst under said hydroforming conditions for a sufficient period of time to effect the desired conversion and recovering a product of improved octane rating.

5. A method of hydroforming a naphtha which comprises contacting naphtha at hydroforming conditions of temperature and pressure in the presence of hydrogen with a catalyst comprising an adsorptive form of alumina containing platinum and made by heating said catalyst to a calcining temperature above about 1100° F. for at least 2 hours, rapidly cooling said catalyst in no more than about 50 seconds to a temperature at least as low as room temperature, permitting the naphtha to remain in contact with said catalyst under said hydroforming conditions for a sufficient period of time to effect the desired conversion and recovering a product of improved octane rating.

References Cited in the file of this patent

UNITED STATES PATENTS

| | | |
|---|---|---|
| 1,192,709 | Tone | July 25, 1916 |
| 2,397,218 | Sturgeon | Mar. 26, 1946 |
| 2,636,865 | Kimberlin | Apr. 28, 1953 |
| 2,658,028 | Haensel | Nov. 3, 1953 |
| 2,748,062 | Doumani | May 29, 1956 |
| 2,767,227 | Calfee et al. | Oct. 16, 1956 |

OTHER REFERENCES

"Thermal Transformation of Aluminas," Stumpt et al., Ind. & Eng. Chem., vol. 42, 1950, pages 1398 to 1403.